United States Patent [19]

Morey

[11] 3,806,795
[45] Apr. 23, 1974

[54] GEOPHYSICAL SURVEYING SYSTEM EMPLOYING ELECTROMAGNETIC IMPULSES

[75] Inventor: Rexford M. Morey, Groton, Mass.

[73] Assignee: Geophysical Survey Systems Inc., North Billerica, Mass.

[22] Filed: Jan. 3, 1972

[21] Appl. No.: 214,933

[52] U.S. Cl. ................................. 324/6, 343/740
[51] Int. Cl. ............................................ G01v 3/12
[58] Field of Search ............... 324/3, 4, 6, 52, 740; 343/5, 11, 13

[56] References Cited
UNITED STATES PATENTS

| | | | |
|---|---|---|---|
| 2,285,669 | 6/1942 | Lehmann | 343/740 |
| 2,077,707 | 4/1937 | Melton | 324/6 X |
| 2,657,380 | 10/1953 | Donaldson | 324/6 X |
| 3,286,163 | 11/1966 | Holser et al. | 324/6 |
| 3,434,049 | 3/1969 | Frye | 324/52 |
| 3,600,674 | 8/1971 | Roberts | 324/52 |
| 3,315,155 | 4/1967 | Colani | 324/6 X |
| 3,538,430 | 11/1970 | Bulgakov et al. | 324/6 |

OTHER PUBLICATIONS

Barringer Research Ltd., "Research Directed to ... by pulsed VHF Propagation Methods," Final Report on Contract No. AF19(628)–2,998, March, 1965.

Cook, J. C., "Monocycle Radar Pulses as Environmental Probes," Institute of Science and Technology, Univ. of Mich. 1964, pp. 223–231.

Lundien, J. R., Terrain Analysis by Electromagnetic Means, Technical Report No. 3–693, Report 2 U.S. Army Engineer Waterways Experiment Station Corps of Engineers, Vicksburg, Miss., September, 1966.

Primary Examiner—Gerard R. Strecker
Attorney, Agent, or Firm—Wolf, Greenfield & Sacks

[57] ABSTRACT

A geophysical survey system is disclosed for determining the character of the subterrain by analysis of reflections from electromagnetic pulses radiated into the ground. The system repetitively radiates into the ground a short duration electromagnetic pulse having a rise time in the order of 1 nanosecond. The antenna which radiates the pulse into the ground is employed to receive the reflections of the pulse. The received signals are coupled through a transmit-receive network to a receiver which permits the input signal waveform to be reconstructed from a sequence of samples taken by the receiver. The system is capable of generating a profile chart indicating the magnitudes of the reflected signals and the depths at which the reflections occurred.

2 Claims, 12 Drawing Figures

TRANSMITTED PULSE AT ANTENNA TERMINALS $T_r \approx 1 \times 10^{-9}$ sec

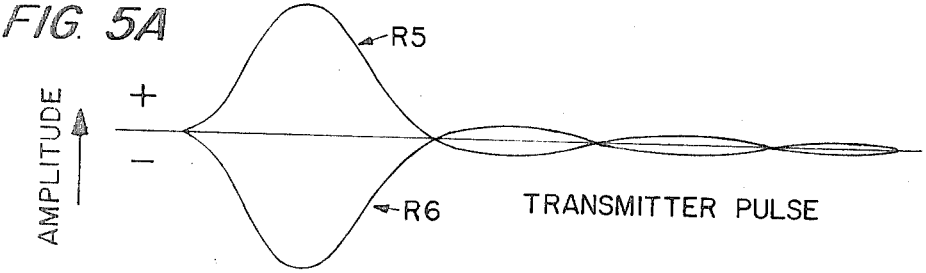
FIG. 5A TRANSMITTER PULSE
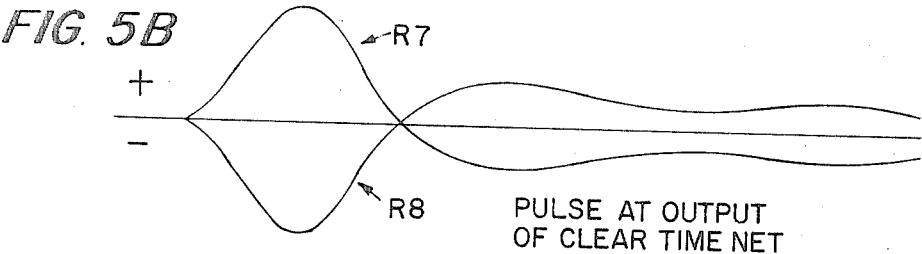
FIG. 5B PULSE AT OUTPUT OF CLEAR TIME NET
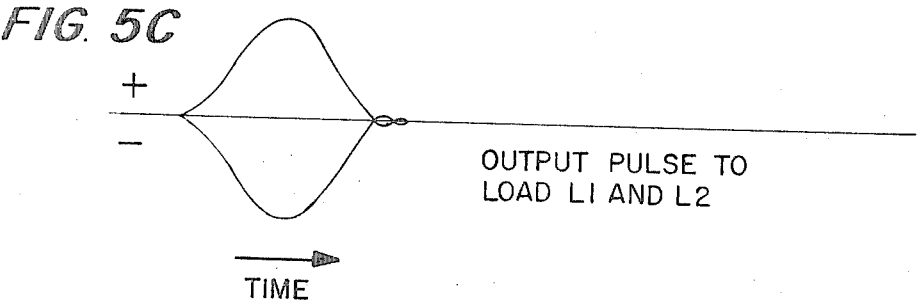
FIG. 5C OUTPUT PULSE TO LOAD L1 AND L2
TIME
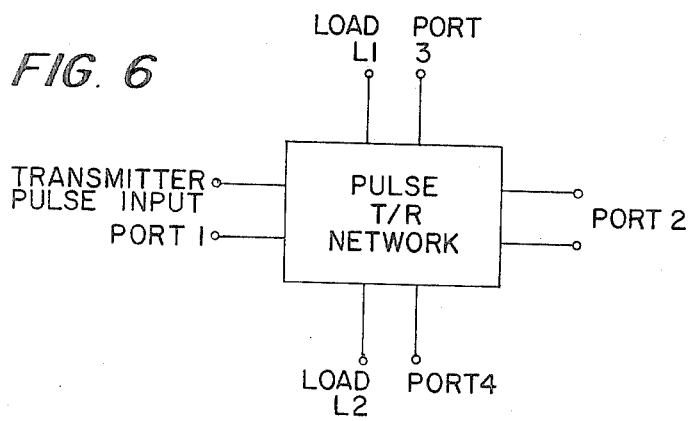
FIG. 6

GEOPHYSICAL SURVEYING SYSTEM EMPLOYING ELECTROMAGNETIC IMPULSES

This invention relates in general to geophysical surveying. More particularly, the invention pertains to apparatus for determining the character of the subterrain at shallow depths by ascertaining the relative amplitude and the relative time of reflections from electromagnetic waves transmitted into the ground. The invention permits a profile to be produced which provides a continuous cross-sectional view of the ground in which are detailed soil and rock interfaces and in which buried objects such as gas pipes, sewer lines, telephone lines, cables, etc., can be identified.

BACKGROUND OF THE INVENTION

The use of reflected electromagnetic waves to locate and determine the depth of geologic formations is disclosed in U.S. Pat. No. 2,077,707 to Benjamin Melton. In prospecting by the method of reflected electrical pulses, deep penetration by the electromagnetic waves was an important consideration and the longer wave lengths were recognized as giving greater penetration. A factor which militated against the use of shorter wave lengths was the considerably increased scattering which occurs at the higher frequencies.

For greater penetration, the desirability of employing pulses of relatively long duration was acknowledged. However, to provide for reflective strata situated at relatively shallow depths, U.S. Pat. No. 2,657,380 to Donaldson proposed the employment of constant amplitude pulses having a duration of about one quarter of a microsecond. J. C. Cook in his article "Monocycle Radar Pulses as Environmental Probes," Institute of Science and Technology, University of Michigan, 1964, proposed to utilize a pulse consisting of only a single wave as a compromise between short pulse duration and long wavelength. In his article Cook recommended finding a wavelength at which absorption accompanying electrical conduction is not prohibitive and losses caused by scattering are not too severe. However, Geleynse and Barringer, in "Recent Progress in Remote Sensing With Audio and Radio Frequency Pulses," Institute of Science and Technology, University of Michigan, 1964, reported from their soil studies that good correlation between the received signal waveform and the actual moisture content was obtained from homogeneous soils, but the amplitudes of the reflected signals were considerably modified by layered soil conditions. The report stated that, "Investigations revealed that reflections on any single frequency from the surface of a soil cannot be relied upon for estimating dielectric constants, due to the widespread prevalence of moisture discontinuities in soils." While the conclusion is reached in the report that the effect of soil layering can be properly recognized through broad band frequency techniques, the system proposed in that report is an airborne system having a plurality of transmitting antennas each of which radiates a portion of the broad band spectrum.

In the prior art systems directed to ascertaining the nature of the subterrain by reflections of pulsed electromagnetic energy, it has been conventional to employ separated transmitting and receiving antennas. In such systems, the receiving antenna is situated to intercept energy reflected from electrical discontinuities in the ground while being sufficiently shielded or spaced from the transmitter so that the receiver is not overloaded by direct radiation from the transmitter. In some prior art systems, the antennas have been elevated above the ground by booms or where a single antenna was used, the antenna was airborne. In those systems, the distance between the antenna and the ground surface permitted the system to be brought into condition for reception in the interval between transmission and the arrival of the first reflection from the ground. The prior art systems utterly fail to treat the case where the transmitting antenna is so close to the reflective object that the use of a separate receiving antenna is not feasible.

THE INVENTION

The invention resides in a system for determining the character of the terrain's subsurface at shallow depths by the repetitive transmission into the ground of an electromagnetic impulse containing the broad range of frequencies requisite to permit the nature of the subsurface to be ascertained from an analysis of the reflections from the impulse. In the invention, the rise time of the generated pulse is in the order of 1 nanosecond and the shape of the pulse is such that it contains a broad spectrum of frequencies which includes the higher frequencies that are useful only for shallow depths. The pulse, in accordance with the invention, includes fequencies at least up to 300 $MH_z$ and preferably the frequencies extend up to 400 $MH_z$. The repetition rate at which the pulse is recurrently transmitted is not critical but the rate ought not to be so high that pulse ambiguities arise because the pulses follow one another too closely. In the invention a single antenna which is close to the ground is employed for both transmission and reception. An important consideration is the employment of a single broad band antenna which is impulse excited for transmission and, is quickly brought to a condition where it can receive reflections from its radiations. The broad band antenna, despite being impulse excited for transmission, is quickly damped so that it can "listen" for echoes from reflectors that are but short distances away. Inasmuch as the entire system is impulse-excited during transmission, the invention employs a T-R (transmit-receive) network which quickly places the system in condition to listen for reflections while protecting the receiver during pulse transmission.

THE DRAWINGS

The invention, both as to its arrangement and mode of operation, can be better understood from the exposition which follows when it is considered in conjunction with the accompanying drawings in which FIG. 1 shows the scheme of a preferred embodiment of the invention;

FIG. 5A to 5C depicts waveforms associated with T-R network;

FIG. 6 shows the T-R network as a four port device;

THE EXPOSITION

Figure 1:
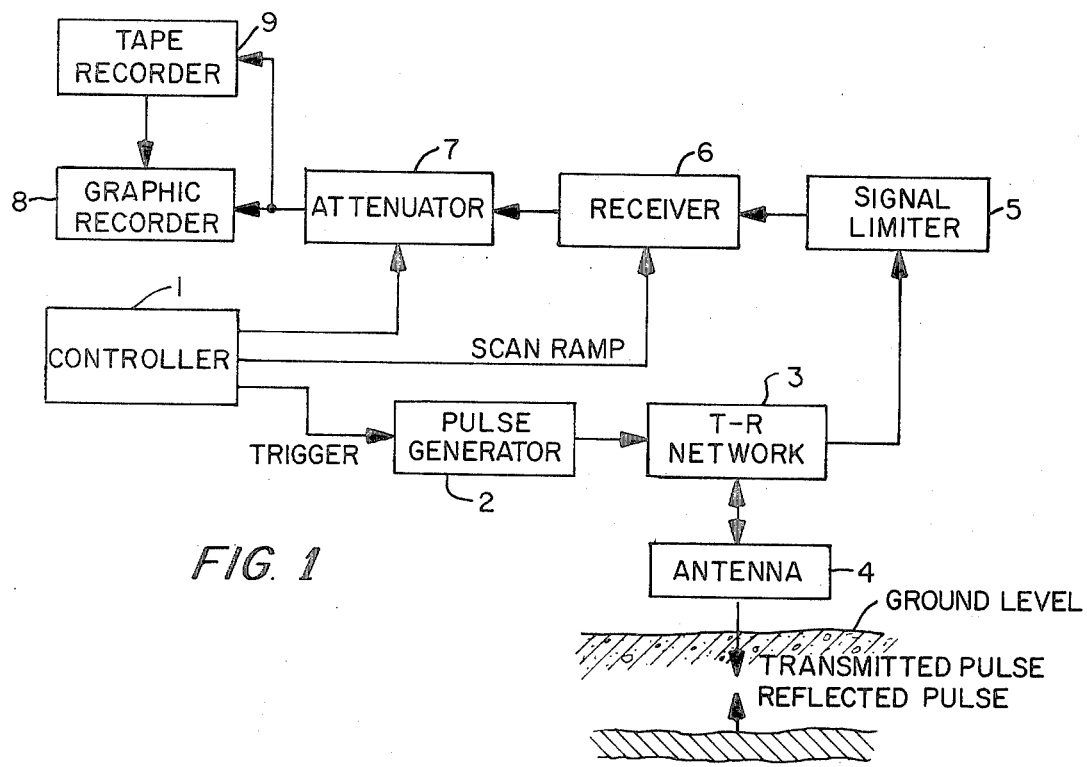

The scheme of a preferred embodiment of the invention is depicted in diagrammatic form in FIG. 1. Operation of the system is governed by a controller 1 which emits a trigger pulse to a pulse generator 2. In response to the trigger pulse, a pulse of the requisite shape and duration is generated and is coupled through a T-R network 3 to an antenna 4. The antenna is a broad band device which is impulse-excited to radiate electromagnetic energy into the ground. In practice, the antenna is elevated two or four inches from the surface of the ground and the antenna is mounted on a carriage that can be pulled over the ground to permit a continuous profile of the subterrain to be obtained. The system, except for the antenna, is carried in a vehicle which tows the carriage carrying the antenna. A flexible transmission line is employed to couple the T-R network to the antenna to permit the carriage to easily ride over uneven or rough ground without the restraint imposed by a rigid connection.

Inasmuch as the system is intended to be employed for shallow depths where the maximum depth of interest may, for example, be 40 feet, and where reflective interfaces or reflective objects may be within 4 or 5 feet directly under the antenna, the antenna 4 is employed for the reception of reflected pulse energy. Because the energy is propagated vertically into the ground, the reflections tend to be vertical or very nearly so. However, the greater the depth, the greater is the probability that more of the wave energy will reflect at angles which cause that reflected energy to miss the antenna. Thus, in addition to the attenuation due to the longer path length, a smaller portion of the energy reflected from the deeper depths reaches the antenna. Because the depths are shallow and the path lengths are short, the scattering which occurs at the higher frequencies (i.e., 300 $MH_z$ and above) becomes of lesser significance to the greater detail which is obtained with short wave lengths. Although it is known that the frequencies of 300 $MH_z$ and above do not penetrate the soil to the depths achieved with the longer wave lengths, nevertheless, the invention utilizes the higher frequencies because adequate penetration for shallow depths is obtained at the higher frequencies with moderate amounts of power, even where the frequency spectrum includes frequencies up to 400 $MH_z$.

Figure 2:
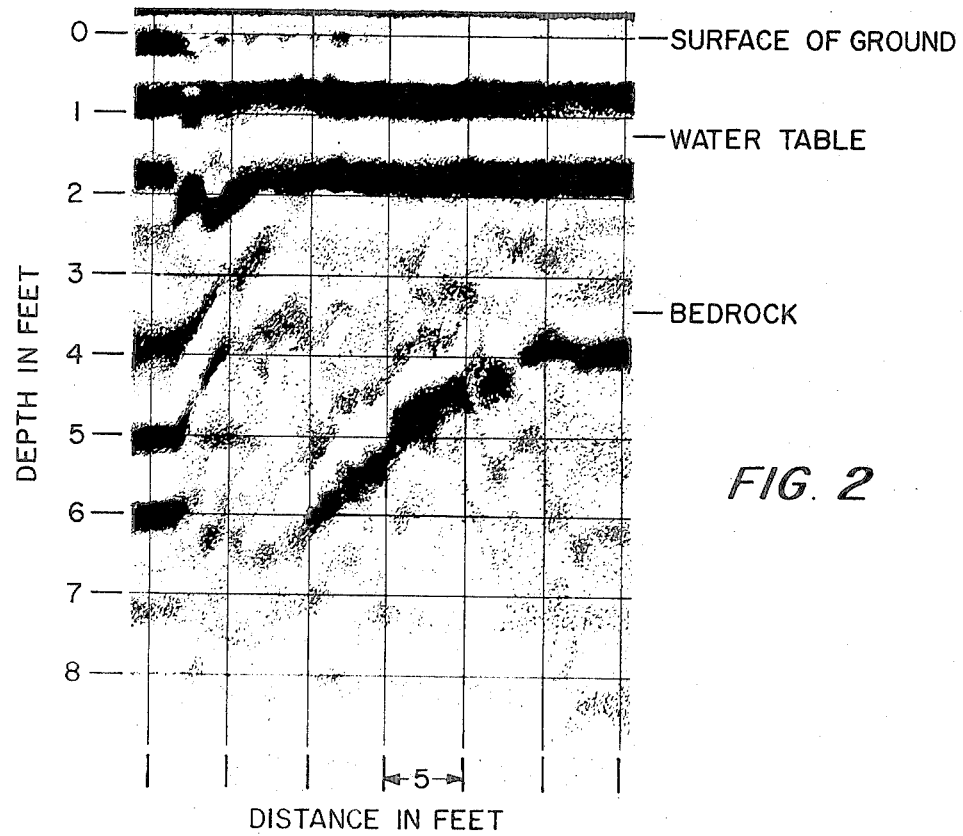
FIG. 2 depicts a profile chart of the type provided by the graphic recorder of the FIG. 1 embodiment.

Energy reflected from a discontinuity such as the soil-rock interface shown in FIG. 1 is incident upon the antenna 4. The received reflected energy is coupled through the T-R network and through a signal limiter 5 to a receiver 6. The receiver may include an oscilloscope of the sampling type whose sweep is synchronized with the transmitted pulse by a "scan ramp" signal emitted by the controller 1. The signal limiter prevents the receiver from being overdriven by the large signals that result from reflective objects or interfaces close to the antenna. Of course, as the electromagnetic waves penetrate deeper into the ground, the energy is attenuated and signals reflected back to the antenna become increasing weaker with the depth of the reflector. The output of the receiver is coupled to a variable attenuator 7 which provides maximum attenuation during and immediately following transmission, with the attenuation being gradually reduced to provide minimum attenuation at the end of the receiving interval. The attenuator 7 is of the type whose attenuation can be varied by an electrical signal and in the invention the attenuator is controlled by a signal emitted by controller 1. The output of the attenuator may be applied to a graphic recorder 8 to obtain a profile chart of the type depicted in FIG. 2. In that profile chart, depth is indicated in feet along the vertical axis and the distance over which the antenna was towed is indicated along the horizontal axis. The strength of the received signal is shown by the density of the markings. It is apparent that the interfaces at the water table resulted in strong reflections.

In lieu of or in addition to the graphic recorder, the output of the receiver may be coupled to a tape recorder to permit the signals to be recorded upon tape. The signals may then be reproduced at a later time and employed as the input to a graphic recorder to obtain a chart of the FIG. 2 type.

Figure 3:
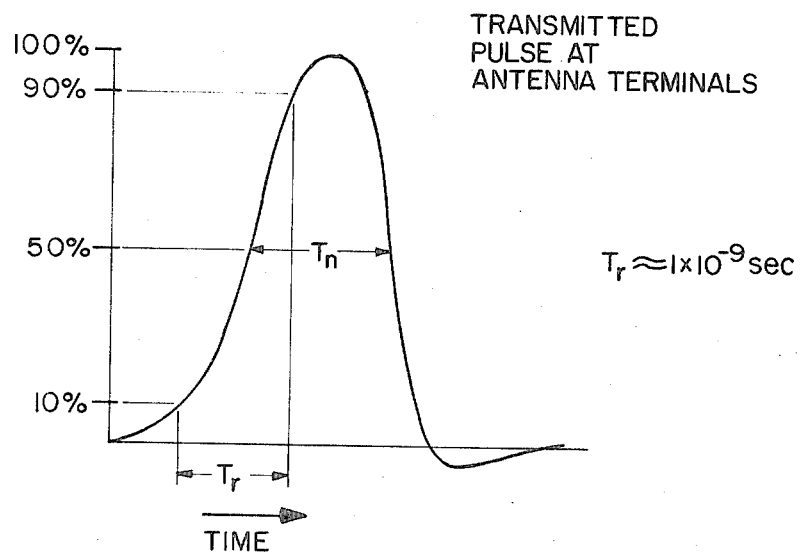
FIG. 3 illustrates the pulse generated in the operation of the preferred embodiment.

The transmitter complex includes the pulse generator 2, the I-R network 3, and the antenna 4. The pulse generator provides a pulse of short duration to the T-R network which passes the pulse to the antenna while preventing appreciable feed-through to the receiver. The shape of the pulse at the antenna terminals is shown in FIG. 3. That pulse has a rise time $T_r$ of about 1 nanosecond (1ns) measured between the 10 percent and 90 percent amplitude levels of the pulse. The pulse width at the 50% amplitude level is about 3 nanoseconds when used with the FIG. 9 or FIG. 10 antenna but the pulse can be as long as 10 nanoseconds, depending upon the type of antenna that is employed. For the pulse to contain the requisite spectrum of frequencies, the pulse rise time should preferably be about 1 nanosecond but pulse rise times of up to 2 nanoseconds can be employed in some situations, depending upon the nature of the subsurface terrain. A fast rising pulse of 1 nanosecond rise time will, in general, contain frequencies at least up to 350 $MH_z$. In an embodiment of the invention employing an antenna of the type shown in FIG. 9, a pulse amplitude of 30 volts, measured at the antenna terminals, was found adequate for soundings to a depth of 20 feet.

Figure 4:
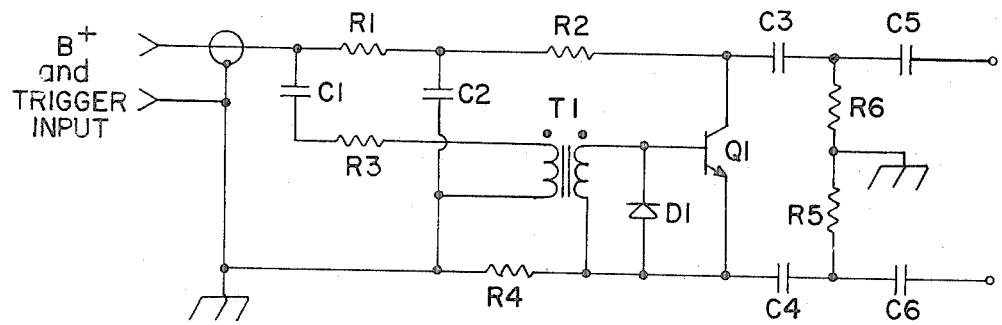
FIG. 4 is a schematic diagram of a suitable pulse generator.

In FIG. 4, a suitable pulse generator is shown which employs a transistor Q1 in the avalanche mode. Because D.C. power and the trigger signal are both applied at input terminal 11, a filter consisting of resistor R1 and capacitor C2 is employed to separate the trigger pulse from the applied power. The emitter of transistor Q1 is connected to ground through resistor R4 and D.C. power is applied the collector of the transistor through serial resistors R1 and R2. The base of the transistor is coupled through the secondary winding of a pulse transformer T1 to the transistor's emitter. A diode D1 is connected in shunt with the secondary winding of the transformer. The primary of transformer T1 is coupled by capacitor C1 to terminal 11 and has its other end grounded. The collector of transistor Q1 is coupled through capacitor C3 and resistor R6 to ground and the emitter is, in a symmetrical arrangement, coupled through capacitor C4 and resistor R5 to ground. The outputs of the pulse generator are obtained through capacitors C5 and C6.

In operation, D.C. power is applied through resistor R2 to the collector of transistor Q1. The zener breakdown voltage of the collector-base junction of Q1 is less than the voltage applied to the collector. Therefore, current passes through the collector-base junction, flows out of the base, through the secondary of transformer T1, and through R4 to ground. In this state, the transistor Q1 is ready to be triggered. When triggered, the energy delivered at the output of the pulse generator is the charge in capacitors C3 and C4.

The trigger pulse from the controller is applied at terminal 11 and is coupled through C1 and R3 to the primary winding of transformer T1. The transformer couples the trigger pulse to the emitter-base junction of Q1 with minimal loading effects so that Q1 and its associated networks can be viewed as a free-floating system which has balanced loading to ground where R2 is balanced by R4, R5 is balanced by R6, C3 is balanced by C4, etc. Thus, transistor Q1, acting as a switch, produces a negative going pulse across R6 and a positive pulse across R5, as indicated in FIG. 5A.

As depicted in FIG. 6, the T-R network can be viewed as a four port device in which port 1 receives the output of the pulse generator, port 2 provides the output for the receiver 6, and ports 3 and 4 are connected respectively to loads L1 and L2.

Figure 7:
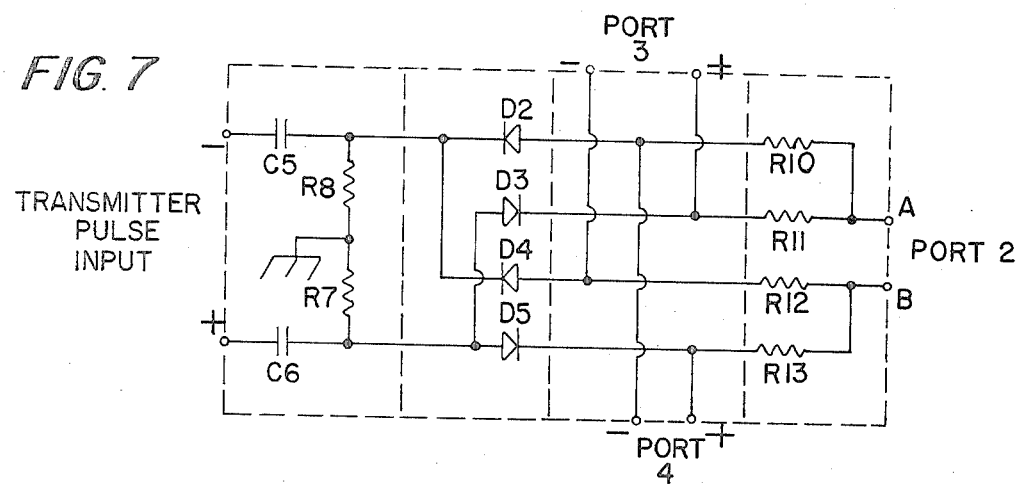
FIG. 7 is a schematic diagram of the T-R network.

A circuit diagram of an embodiment of a suitable T-R network is shown in FIG. 7 where capacitors C5 and C6 are the same components shown in FIG. 4. Capacitors C5 and C6 are connected to ground by resistors R8 and R7 respectively. For ease of exposition, the output terminals at port 2 are designated A and B. Terminal A is coupled through resistor R10 and diode D2 to the junction of C5 and R8. Also terminal A is coupled through resistor R11 and diode D3 to the junction of C6 and R7. However, diode D3 is arranged so that it is oppositely poled with respect to diode D2. In a similar manner, terminal B is coupled through resistor R12 and diode D4 to the junction of C5 and R8 and is coupled to the junction of C6 and R7 by resistor R13 and diode D5. Port 3 has one of its terminals connected to the cathode of D3 and its other terminal connected to the anode of D4. Port 4 has one of its terminals connected to the anode of D2 and its other terminal connected to the cathode of D5.

FIG. 5 shows typical waveforms associated with the T-R network. FIG. 5A shows the pulses appearing at the output of the pulse generator. When those pulses are fed through C5 and C6 and the diode coupler to the low impedance load presented by the resistive bridge, both C5 and C6 are charged by the rectified currents flowing through the diodes. When the pulses developed across resistors R7 and R8 swing toward zero and cross the axis, as indicated in FIG. 5B, reverse voltages are developed on all four diodes which cause those diodes to block current flow. Therefore, the output pulses to ports 3 and 4, shown in FIG. 5C, have negligible overshoot crossing the axis and the T-R network thereby is in condition to receive signals from the antenna almost immediately. In effect, the network formed by capacitors C5, C6 and resistors R7, R8 decouple the T-R device from ringing or loading effects of the pulse generator for a period sufficient to "clear-time" the received signal.

The resistors R10, R11, R12, R13 forming the bridge in the T-R device are all equal so that when a positive pulse is applied through D3 to resistor R11 and a negative pulse is simultaneously applied through D2 to resistor R10, no pulse appears at terminal A. Similarly, no pulse appears at terminal B because resistors R12 and R13 are balanced. Inasmuch as the operation of the bridge depends upon symmetry, the bridge balance is optimum when load L1 is equal to load L2.

After the pulses from the generator have passed through the T-R network and the generator has been decoupled from the T-R network by the reverse biased diodes of the diode coupler, ports 3 and 4 become the input ports and port 2 becomes the output port. Inasmuch as the resistive bridge is a differential network, any unbalance in the loads L1 and L2 act to unbalance the bridge and result in a signal being emitted from port 2 to the receiver.

Port 3, as indicated in FIG. 7, is loaded by the antenna whereas port 4 is loaded by a "null line" arrangement which has a surge characteristic similar to the antenna. In the null line arrangement shown in FIG. 8, resistors R9 and R15 together with the null line N1 provide one half of the load L2 while resistors R14, R16, and null line N2 provide the other half of that load. The total surge impedance of the null line arrangement is set to coincide as closely as possible with the antenna system to provide cancellation of as much as possible of the mismatch signal from the antenna. The null lines N1 and N2, in their simplest form, are co-axial cables whose lengths are trimmed to obtain the requisite cancellation.

Figure 8:
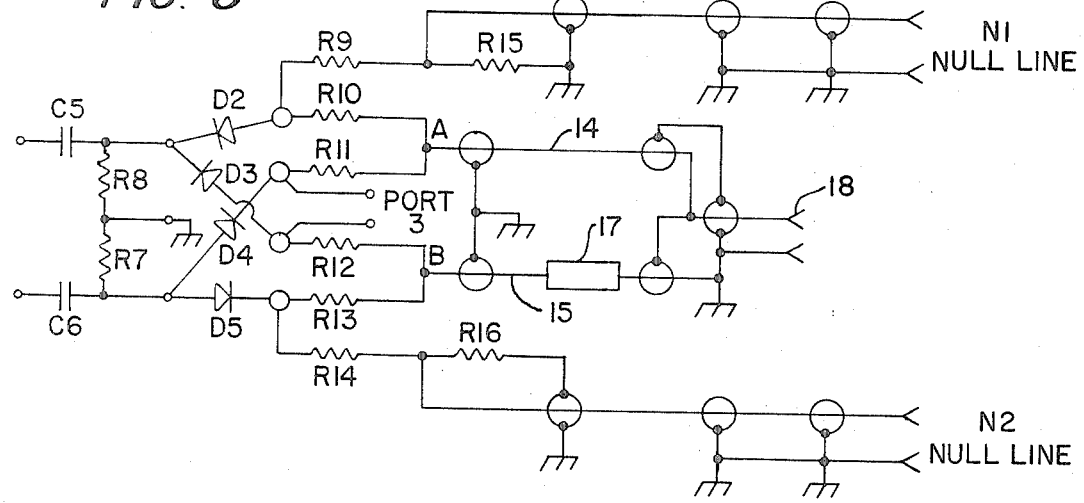
FIG. 8 shows the manner in which the T-R network is loaded by the null lines.

FIG. 8 also shows a balun arrangement which converts the differential signal at port 2 of the T-R network into a common mode signal which is transmitted by coaxial line to the receiver. Assuming that resistors R10, R11, R12, R13 each have a resistance of 100 ohms, two lengths 14, 15 of 100 ohm coaxial cable are connected to terminals A and B of port 2. Cable 14 is connected as a delay line from terminal 3 to the connector 16 and that cable has its outer conductor grounded at both ends. Cable 15 is connected in the normal manner at terminal B (i.e. with the outer conductor at ground and the center conductor connected to terminal B). The cable then passes through a ferrite isolator 17 to the connector 16 where the center conductor of cable 15 is connected to ground and the outer conductor of cable 15 is connected to the center conductor of the connector. By this arrangement, the signal from terminal B is inverted and adds to the signal from terminal A. Because the balun cables 14, 15 are each 100 ohm lines, the balun arrangement is matched to the 50 ohm coaxial line extending from connector 16 to the receiver so long as the signal at terminals A and B are equal and of opposite polarity.

THE ANTENNA

The antenna is an important element of the system because it, in part, determines the characteristics of the transmitted pulse. The ideal antenna would be an infinitely long reflectionless radiator inasmuch as the pulse would travel down the radiator and would never again reappear. A practical antenna must, of course, be of finite length and must also be sufficiently compact to permit it to be transported over the ground along the track of the subsurface profile which is to be generated.

In addition to being a good radiator, the practical antenna must simulate an infinitely long radiator by absorbing and dissipating the energy that travels out to the end of the radiator. If the energy is not absorbed and dissipated, it returns over the radiator and radiates a second pulse into the ground which follows closely behind the first pulse. Both pulses give rise to reflections which are difficult to sort out and which make analysis of the signal returns very difficult to interpret.

One solution to the antenna problem is to coat the antenna with a lossy material which causes the wave energy to be entirely dissipated just when the wave reaches the tip of the radiator. Such an antenna would, of course, be an inefficient radiator and would be nearly useless for the reception of weak signals.

Figure 9:
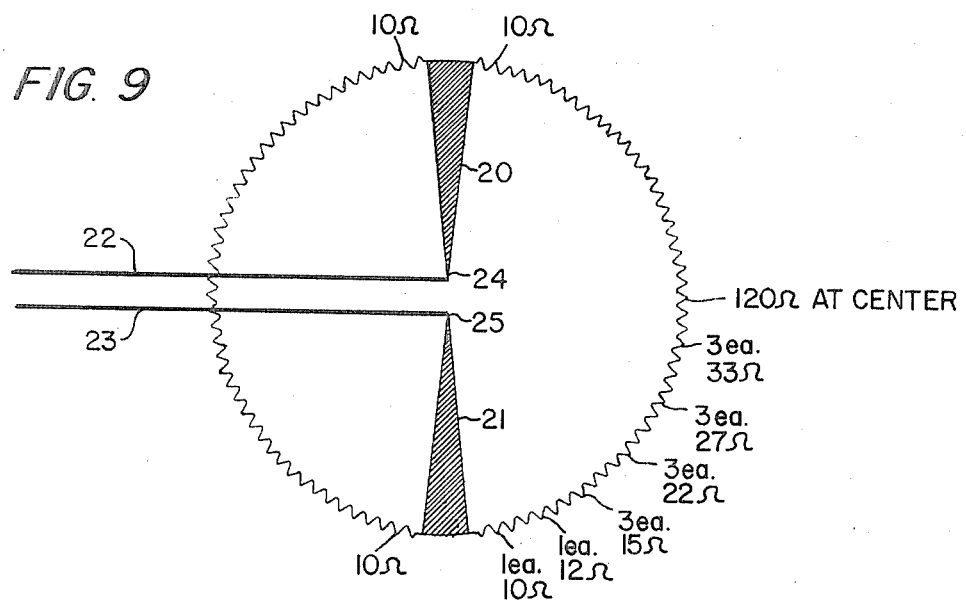
FIG. 9 shows a preferred embodiment of a "top loaded" antenna suitable for use in the FIG. 1 embodiment.
Figure 10:
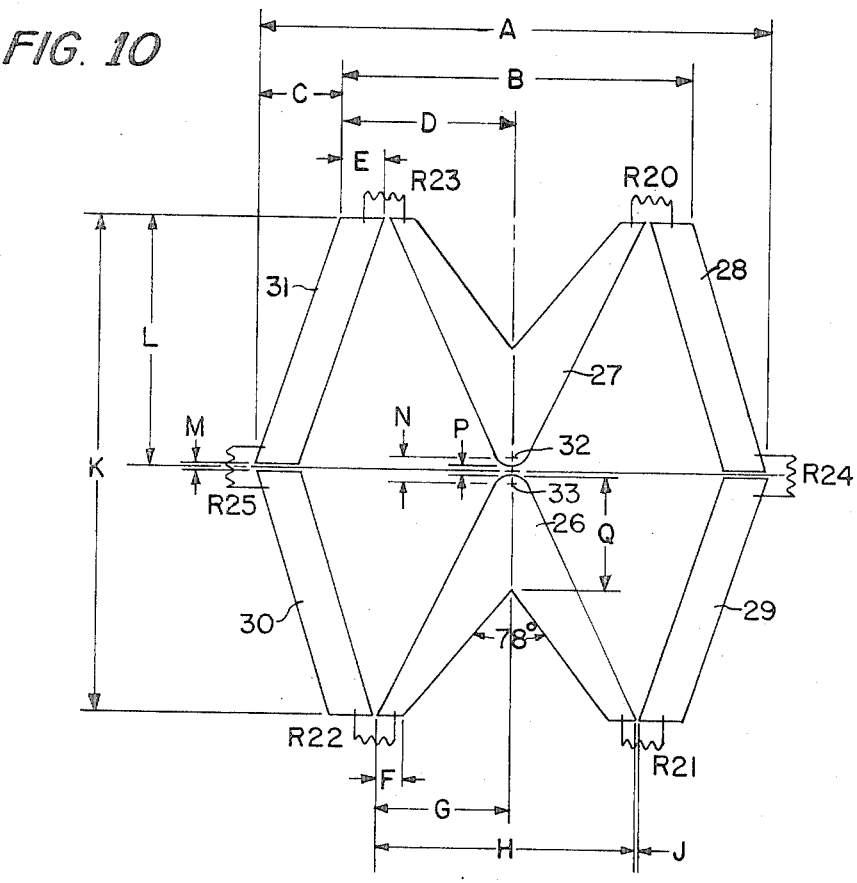
FIG. 10 shows another embodiment of a top loaded antenna.

Suitable antennas have been constructed for use in the system. Two of those antennas are depicted in FIGS. 9 and 10. Those two antennas have a number of common characteristics and those antennas are referred to as "top-loaded" antennas.

In FIG. 9, the antenna employs a pair of radiators 20, 21 which are thin flat copper strips mounted on an insulative substrate. A sheet of epoxy filled glass has been found to be a suitable substrate. Each radiator is a sector of a circle covering an angle of about 10°. In the illustrated embodiment, the ends of the radiators are connected by strings of resistors forming a circle whose diameter is 34 inches. The circle can be considered to be divided into quadrants, with the resistance in each quadrant having a sine distribution. For example, assuming the resistance to be 380 ohms per quadrant and arbitrarily subdividing each quadrant into 18 equal sectors, the sine distribution of the resistance is tabulated as follows:

| Sector | % | ohms | Approximation |
|---|---|---|---|
| 1 | .004 | 1.52) | |
| 2 | .011 | 4.18) | 10 |
| 3 | .019 | 7.2) | |
| 4 | .026 | 9.9 | 12 |
| 5 | .034 | 12.9 | 15 |
| 6 | .040 | 15.2 | 15 |
| 7 | .047 | 17.8 | 15 |
| 8 | .053 | 20.1 | 22 |
| 9 | .059 | 22.4 | 22 |
| 10 | .064 | 24.3 | 22 |
| 11 | .069 | 26.2 | 27 |
| 12 | .074 | 28.1 | 27 |
| 13 | .077 | 29.25 | 27 |
| 14 | .081 | 30.8 | 33 |
| 15 | .083 | 31.5 | 33 |
| 16 | .085 | 32.3 | 33 |
| 17 | .087 | 33 | 33 |
| 18 | .087 | 33 | 33 |

An approximation of the sine distribution was utilized in an antenna that was built and was found to perform adequately. The ohmic values used in the approximation are set out in the table above. The tabulated resistor value are typical for the string of resistors in each quadrant. At the center, the strings of resistors in each quadrant are joined by a resistor R18 or R19 having a resistance of about 120 ohms.

When used in the transmitter mode, the input to the antenna is over a twin lead transmission line having a pair of aluminum rods 22, 23 whose ends are connected to the antenna feed terminals 24, 25. Each rod has a diameter of 3/16 inch and is 34 inches in length. The rods are spaced 2 9/16 inches from center to center of the rods.

FIG. 10 depicts an alternate embodiment of the top loaded antenna. The radiators 26, 27 are constituted of thin sheet copper cemented to an insulative substrate such as a sheet of an epoxy filled material. Each of the radiators is about 17 inches in length and has a pair of arms which commence diverging 8.50 inches from the apex of the radiator. The arms diverge at an angle of about 78° as indicated in FIG. 10. The tips of the divergent arms are connected to conductive strips 28, 29, 30, 31 by load resistors R20, R21, R22, R23 each of those resistors having a resistance of 107 ohms. Strips 28, 29 are center loaded by 170 ohm resistor R24 and strips 30, 31 are similarly loaded by resistor R25 of 170 ohms. Strips 28, 29, 30, 31 are 3 inch wide strips of copper foil which are secured on the insulative substrate in the same manner as radiators 26 and 27.

The antenna depicted in FIG. 10 is symmetrical about its horizontal and vertical lines and forms a "double diamond." A pair of RG-62 cables (characteristic impedance of 93 ohms) are connected to the antenna terminals 32,33 to provide transmission line coupling from the T-R network to the antenna. The dimensions in inches for a double diamond antenna which was built and found to provide satisfactory performance are tabulated below.

| Dimension | Inches |
|---|---|
| A | 35.50 |
| B | 24.12 |
| C | 5.68 |
| D | 12.06 |
| E | 3.00 |
| F | 1.75 |
| G | 9.00 |
| H | 18.00 |
| J | .062 |
| K | 35.00 |
| L | 17.50 |
| M | .062 |
| N | .750 |
| P | .500 |
| Q | 8.50 |

The antennas depicted in FIGS. 9 and 10 were arrived at largely by empirical techniques and it is anticipated that some variation in the dimensions and in the values of the resistors can be tolerated without substantial degradation in performance. The duration of the pulse is, to an extent, matched to the antenna (especially the length of the radiators) and therefore where the dimensions of the antenna are changed, the optimum duration of the pulse can be expected to change. As an empirical rule, the optimum duration of the pulse is attained when the pulse appearing at the antenna input terminals terminates just as the pulse wavefront reaches the tip of the radiator.

In the system depicted in FIG. 1, the receiver may be a sampling oscilloscope such, for example, as the Model 180A sampling oscilloscope made by the Hewlett-Packard company. In that type of oscilloscope the input waveform is reconstructed from a sequence of samples taken during many recurrences of the waveform. Each sample in the reconstruction sequence is taken at a slightly later point on the recurring waveform. In this way, the waveform is reconstructed, point by point, with the resolution being determined by the number of samples in the sequence. The sampling oscilloscope may include signal amplifier plug-in units and the entire receiver may be assembled from such readily available items.

An important feature of the invention is the rapid rise time of the transmitted pulse. Preferably the rise time of the pulse is in the order of 1 nanosecond. Some increase in rise time can be tolerated but the rise time ought not to be more than 2 nanoseconds as otherwise information in the signal returns will be substantially degraded. The rise time may be as short as half a nanosecond (½ ns) but ought not to be shorter than that to avoid the diversion of power into high frequencies (above 400 MH$_z$) which do not effectively penetrate the ground even to shallow depths. The duration of the pulse is less than 10 nanoseconds and is about 3 nanoseconds when utilizing the antenna of FIG. 9 or FIG. 10. The duration of the pulse is, in part, related to the length of the antenna radiators and to the characteristics of the particular type of antenna employed in the system. Inasmuch as the antenna must be portable and capable of traversing relatively rough terrain, it is desirable to employ an antenna of small size.

Although the preferred embodiment of the invention is here illustrated and described, it is apparent that the invention can take other forms. For example, while the pulse generator is described as employing a transistor in the avalanche mode, it is evident to those familiar with nanosecond pulse generation that other and different types of generators may be employed to generate the required pulse. Further, while a specific transmit-receive network is disclosed, other types of transmit-receive devices may be employed in place of that specific network. Because the invention may be embodied in varied arrangements, it is not intended that the invention be limited to the forms here illustrated or described. For example, the signal limiter may be eliminated where the receiver is of a type which cannot be overdriven or other protective devices or schemes may be employed to protect the receiver from very strong signals. Rather it is intended that the invention be delimited by the appended claims.

I claim:

1. A geophysical surveying system for ascertaining the character of the subterrain at shallow depths, the system comprising a pulse generator for repetitively generating a unipolar electromagnetic pulse having a rise time in the order of 1 nanosecond and a duration of 10 nanoseconds or less, an antenna for transmitting the unipolar pulse into the terrain and for receiving echos of the transmitted pulse, the antenna having elongate radiators that are fan shaped for at least a portion of their length, the apexes of the fans being adjacent to one another, the signal connections to the antenna being at the apexes of the fans, and the ends of the radiators remote from the apexes being terminated by wave energy absorbing means which inhibit ringing of the antenna by the transmitted pulse whereby echos from the energy propagated into the terrain are not masked to any appreciable extent by ringing of the antenna, a receiver having signal sampling means permitting an input signal to be reconstructed from the samples, and transmit-receive means coupling the antenna to the pulse generator and to the signal receiver.

2. In a geophysical surveying system of the type having a pulse generator which repetitively supplies pulses to an antenna that radiates electromagnetic energy into the terrain to enable the character of the subterrain at shallow depths to be ascertained from reflections of the radiated electromagnetic energy, the improvement wherein the pulse generator is adapted to repetitively generate a unipolar electromagnetic pulse having a rise time of less than 2 nanoseconds and a duration of 10 nanoseconds or less, and the antenna has elongate radiators that are fan shaped for at least a portion of their length, the apexes of the fans being adjacent to one another, the pulse from the generator being coupled to the radiators at the apexes of the fans, and the ends of the radiators remote from the apexes being terminated by energy absorbers which inhibit ringing of the antenna by absorbing pulse energy reaching the ends of the radiators.

* * * * *